(12) United States Patent
Zimmer

(10) Patent No.: US 7,600,295 B2
(45) Date of Patent: Oct. 13, 2009

(54) ARRANGEMENT FOR DAMPING PIVOT MOVEMENTS

(76) Inventor: Herbert Zimmer, Hauptstrasse 74, 77886 Lauf (DE)

( * ) Notice: Subject to any disclaimer, the term of this patent is extended or adjusted under 35 U.S.C. 154(b) by 1488 days.

(21) Appl. No.: 10/427,149

(22) Filed: Apr. 30, 2003

(65) Prior Publication Data

US 2003/0200625 A1 Oct. 30, 2003

(30) Foreign Application Priority Data

Apr. 30, 2002 (DE) ............................... 102 19 172

(51) Int. Cl.
 *E05F 1/08* (2006.01)
(52) U.S. Cl. ............................... 16/286; 16/85
(58) Field of Classification Search .............. 16/306, 16/86 R, 85, 84, 82, 86 A, 62, 50, 51, 52, 16/54, DIG. 9, DIG. 10, DIG. 17, 286, 319; 49/381, 386, 398, 399, 397
See application file for complete search history.

(56) References Cited

U.S. PATENT DOCUMENTS

| | | | | |
|---|---|---|---|---|
| 3,707,014 A | * | 12/1972 | Koivusalo | 16/52 |
| 4,075,735 A | * | 2/1978 | Rock et al. | 16/278 |
| 4,251,900 A | * | 2/1981 | Lautenschlager | 16/294 |
| 4,449,269 A | * | 5/1984 | Sundermeier et al. | 16/50 |
| 4,797,971 A | * | 1/1989 | Eger et al. | 16/82 |
| 5,012,551 A | * | 5/1991 | Beneke et al. | 16/49 |
| 5,560,079 A | * | 10/1996 | Jeynes | 16/80 |
| 6,415,477 B1 | * | 7/2002 | Hosaka et al. | 16/327 |
| 6,553,617 B1 | * | 4/2003 | Salice | 16/85 |
| 6,684,453 B2 | * | 2/2004 | Wang | 16/54 |
| 2004/0111831 A1 | * | 6/2004 | Foster | 16/69 |

FOREIGN PATENT DOCUMENTS

| | | |
|---|---|---|
| AT | 373 345 | 1/1984 |
| AT | 004 486 U1 | 7/2001 |
| DE | 1 459 147 | 2/1969 |
| DE | 31 20 201 A1 | 12/1982 |
| DE | 37 41 712 A1 | 6/1989 |
| DE | 197 17 937 A1 | 5/1998 |
| DE | 299 10 626 U1 | 2/2000 |
| DE | 199 22 006 A1 | 11/2000 |
| JP | 06-193335 * | 7/1994 |

* cited by examiner

*Primary Examiner*—Chuck Y. Mah
(74) *Attorney, Agent, or Firm*—Klaus J. Bach

(57) ABSTRACT

In an arrangement for damping the pivot movement of a furniture component which is supported by a pivot joint on a stationary furniture part and which includes a damping element for slowing the movement of the furniture component near one of its end positions, the damping element includes a cylinder and piston unit forming part of a hinge, which includes a hinge housing in which a piston operating member is slidably supported and operatively connected to the piston, and a hinge lever extends between the movable component and the stationary furniture part in such a way that it engages the piston operating member in the hinge housing when the movable component approaches one of its end positions so as to slow down the movable component.

10 Claims, 6 Drawing Sheets

10  27  65  40  30

ARRANGEMENT FOR DAMPING PIVOT MOVEMENTS

BACKGROUND OF THE INVENTION

The invention relates to an arrangement for damping the pivot movement in a pivot range which is delimited by two end positions of a furniture component which is pivotally supported on a stationary furniture part by means of a damping element. The damping element is activated by the pivotable furniture component upon approaching one of its end positions. The damping element comprises a cylinder piston unit, which is directly or indirectly arranged at one of the furniture component and the furniture part and wherein, with the damping action activated, a hydraulic fluid is displaced in a throttled manner.

Pivotally supported furniture components are for example closing lids or doors of a furniture piece. The stationary furniture part is for example the main body of the furniture piece. The pivot range is limited for example by the open and closed end position of the closing lid or door. The furniture component and the furniture part are interconnected for example by a pivot joint. The pivot joint may be a cavity hinge or a strip hinge. The pivot range in which the damping element is activated is disposed either adjacent the closed or the open end position of the pivotally supported furniture component. Upon activation of the damping element, the pivot movement of the furniture element relative to the furniture part is retarded.

DE 299 10 626 U1 discloses a device for damping a pivot movement which device is arranged in the top wall of a furniture piece. Upon activation of the damping device transverse forces are effective on the piston and the piston rod, which may result in canting or blocking of the damping device or it may cause leakage of the cylinder piston unit of the damping device.

It is the object of the present invention to provide an arrangement which slows a movable furniture component down upon approaching one of its end positions so that the end position is reached with no or little noise and a pivot joint which can be installed in a new or an already manufactured furniture piece.

SUMMARY OF THE INVENTION

In an arrangement for damping the pivot movement of a furniture component, which is supported by a pivot joint on a stationary furniture part and which includes a damping element for slowing the movement of the furniture component near one of its end positions, the damping element includes a cylinder and piston unit forming part of a hinge, which includes a hinge housing in which a piston operating member is slidably supported and operatively connected to the piston, and a hinge lever extends between the movable component and the stationary furniture part in such a way that it engages the piston operating member in the hinge housing when the movable component approaches one of its end positions so as to slow down the movable component.

The pivot movement of the movable furniture component is converted by the piston operating member into a translatory movement within the cylinder piston unit. The piston and cylinder are moved relative to each other. As a result, a hydraulic fluid is displaced from a displacement chamber within the cylinder in a throttled manner. The throttling causes a retardation of the pivot movement and prevents an impact or rebound when the movable component reaches the end of its pivot movement. The end position of the pivotable component is reached in a damped and a noiseless fashion.

The cylinder piston unit may be connected directly to the furniture part carrying it or it may be connected to an adapter part, which is connected to the furniture part carrying the cylinder piston unit. Either the cylinder or a piston rod of the cylinder piston unit may be connected to the furniture part carrying the piston cylinder unit.

If the furniture part, which carries the piston cylinder unit, is the pivotable component, an operating element is connected to the stationary furniture part, which activates the damping element. But if the cylinder piston unit is connected to the stationary furniture part, the operating element is connected to the pivotable furniture component.

A simply acting cylinder piston unit and operating element for example are coupled to form a drive structure when the damping is activated. They may be coupled for example by a sliding wedge drive or a crank thrust mechanism.

The cylinder piston unit may have a fixed damping characteristic or an adjustable damping characteristic. The damping characteristic may be linear, logarithmic, progressive etc.

The cylinder piston unit may be fully or partially filled with a hydraulic fluid. It may have a compensation space, which is disposed within or without the unit. The hydraulic fluid may be a liquid or a gas such as air or nitrogen or a combination of these media.

The invention will be described below in greater detail on the basis of the accompanying drawings.

DESCRIPTION OF A PREFERRED EMBODIMENT

Figure 1:
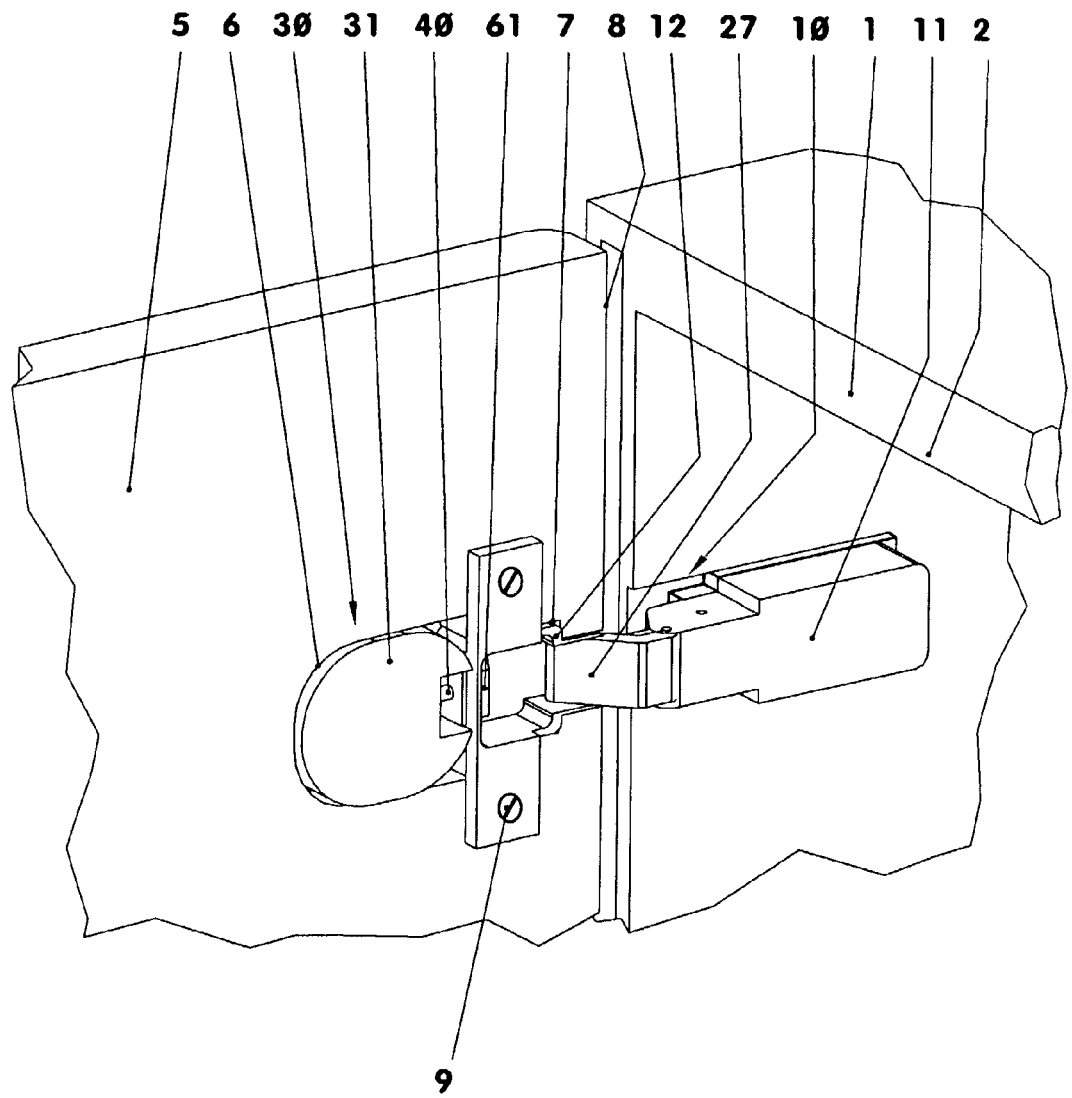
FIG. 1 shows part of a furniture piece with a lid or door open.

FIG. 1 shows part of a furniture piece with a hinge arrangement for damping the pivot movement of a furniture component 5, which is pivotally supported on a stationary furniture part 1. The stationary furniture part 1 is for example the main body of a piece of furniture. The pivotally supported furniture component 5 is for example a closing lid or door, which is pivotally mounted to the main body 1 by means of two cavity hinges 10. The pivot range of the door 5 is delimited for example by the open and closed end positions of the door 5. In the embodiment shown, the door 5 is provided with a damping element 30 in the form of a cylinder piston unit 40.

Figure 2:
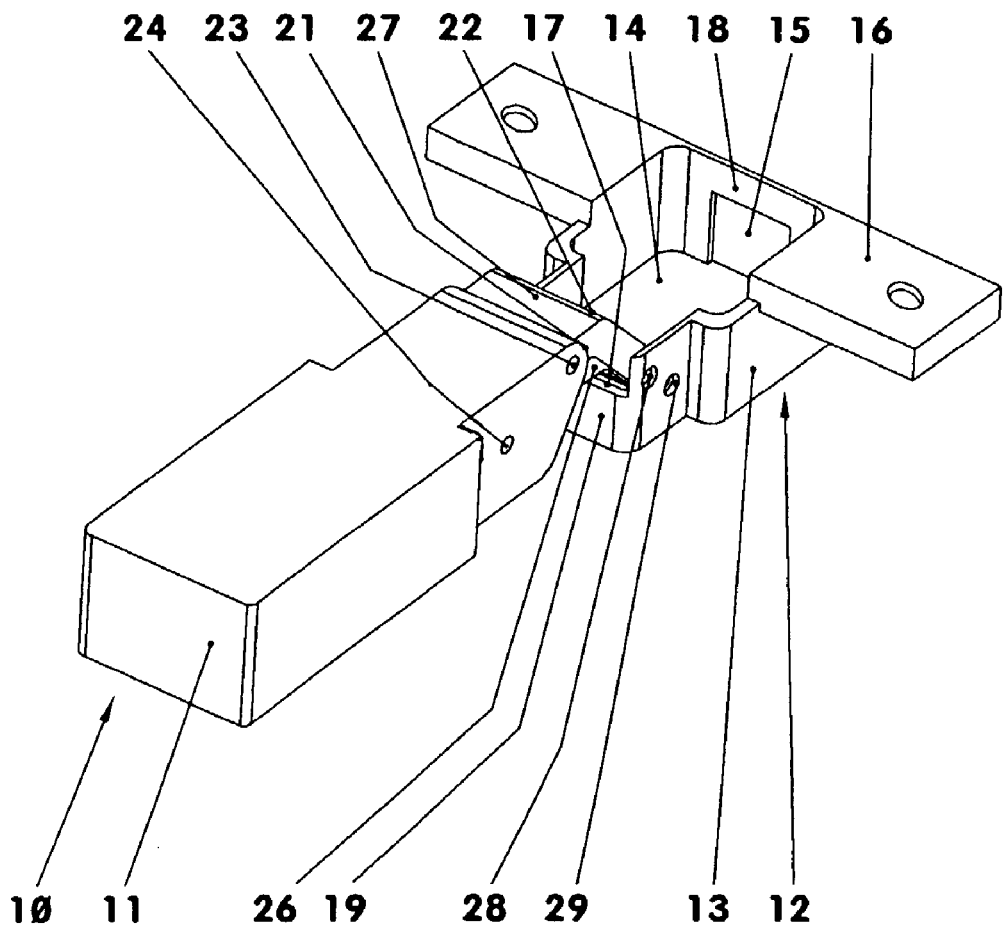
FIG. 2 shows a cavity hinge.

FIG. 2 shows a spring-loaded cavity hinge 10. It comprises a mounting arm 11 a joint housing 12, hinge levers 26 and 27 and a spring which is not seen in FIG. 2.

The mounting arm 11 is a hollowed block-like arm by way of which the cavity hinge 10 is oriented and mounted on the furniture body 1, see FIG. 1. In the area of the mounting arm 11 pointing toward the joint housing 12 two bolts 23, 24 extend through the mounting arm 11 whereby an outer hinge lever 27 and an inner hinge lever 26 are pivotally supported. The bolt 23 of the outer hinge lever 27 is mounted closer toward the joint housing 12 and the interior of the body 1 in spaced relationship from the bolt 24 of the inner hinge lever 26. The hinge levers 26, 27 connect the mounting arm 11 to the joint housing 12.

In the embodiment shown, the joint housing 12 comprises an essentially rectangular frame 13 whose length in the direction of the cavity hinge 10 is greater than its width.

A plate-like bottom part 14 closes the bottom end of the frame 13. The two sides 18, 19 of the frame 13 extending transverse to the longitudinal direction have rectangular openings 15, 17. The opening 17 at the end of the mounting arm 11 provides space for accommodating the movement of the hinge levers 26, 27. The opening 15 in the side wall 18 is essentially square and extends to the bottom part 14. The frame 13 is provided at its top edge (as shown in FIG. 2) with a mounting flange 16 including mounting bores. Adjacent the frame side wall 19 at the end of the mounting arm 11, the hinge levers 26, 27 are pivotally supported on the frame 13 in spaced relationship by the bolts 28, 29. The pivot bolt 28 of the outer hinge lever 27 is disposed near the top end of the frame 13 at the rectangular opening 17. The pivot bolt 29 of the inner hinge lever 26 is displaced or spaced from the bolt 28 in the direction toward the frame side wall 18 and toward the bottom part 14.

Figure 3:
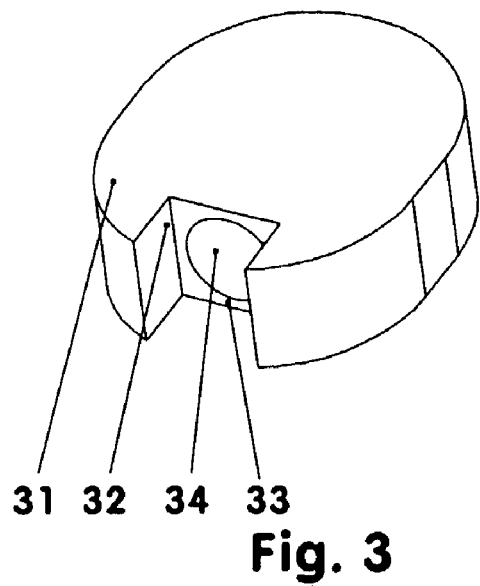
FIG. 3 shows a housing for a damping arrangement.

FIG. 3 shows a damper housing 31 of the damping element 30. The housing 31 is for example, an oval plastic body having a height, which is for example a quarter of its length. Along its longitudinal axis the housing 31 includes a transverse groove 32. The width of the groove 32 is about a third of the width of the housing 31. The depth of the groove 32 in the example shown is about 20% of the length of the housing 31. At the groove base 33, a blind bore 34 extends into the housing 31, which bore has a diameter of about 28% of the width of the housing 31 and an axial length of about 70% of the length of the housing 31. The blind bore 34 is adapted to receive the cylinder piston unit 40.

Figure 4:
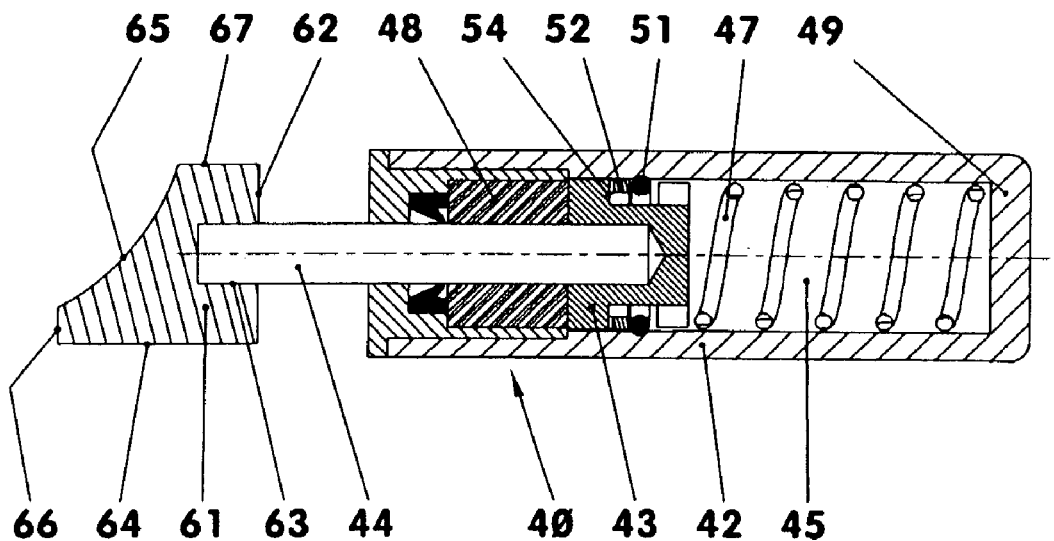
FIG. 4 shows a damping cylinder piston unit.
Figure 5:
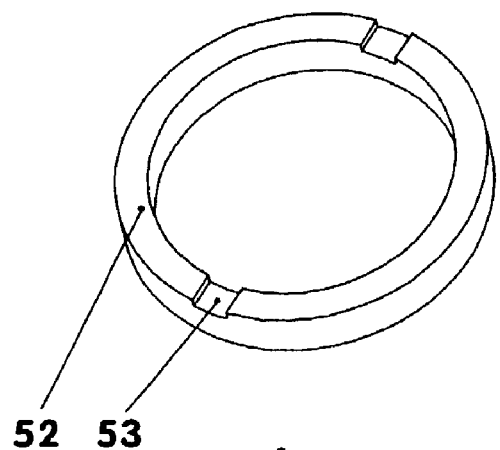
FIG. 5 shows a throttle ring.

The cylinder piston unit (40) is shown in FIG. 4 and comprises a cylinder 42 and a piston 43 movably supported in the cylinder 42 and having a piston rod 44 extending from the cylinder 42. The inner diameter of the cylinder is about three times the diameter of the piston rod 44. The maximum piston stroke is about one and three quarter times the inner diameter of the cylinder 42 and about 45% of the length of the cylinder 42. Further outward movement of the piston 43 is prevented for example by an elastic stop member 48. The elastic stop member 48 may consist for example of an open pore foamed material. The piston 43 delimits within the cylinder 42, together with the cylinder end wall, a displacement chamber 45, in which a return spring 47 is disposed. The return spring 47 engages the piston 43 and biases it outwardly toward the elastic stop member 48. The piston 43 includes a seal element 51, which is for example an O-ring disposed on the piston 43. The seal element 51 is in sealing contact with the interior wall of the cylinder 42.

The piston 43 is further provided with an elastic throttling ring 52, which is disposed between the seal element 51 and a piston stop surface 54. The throttling ring 52 is provided at its surface adjacent the piston stop surface 54 with oppositely arranged radial throttling grooves 53. The throttling grooves 53 have a width of about one twentieth of the outer diameter of the throttling ring 52 and a depth of about one fortieth of the this diameter. The outer diameter of the throttling ring is slightly less than the inner diameter of the cylinder 42. Its inner diameter is for example 10% greater than the outer diameter of the piston neck in this area. When assembled the throttling ring 52 abuts the piston stop surface 54 with its surface including the throttling grooves 53.

The free end of the piston rod 44 carries a piston rod pressure member 61 (see FIG. 4). This is for example a prism-shaped plastic body having a cylinder engagement shoulder 62 with a bore 63 receiving the piston rod 44 (see FIG.S. 4 and 11). At its underside (as represented in FIG. 4), the pressure member 61 is provided with a slide surface 64, which is essentially square and extends normal to the shoulder 62. At its end opposite the shoulder 62, the pressure member 61 has a front face area 66 having a height of about one fifth of the height of the piston rod pressure member 61. Adjacent this front face area 66, the pressure member 61 is provided with a concave slide wedge surface 65, which extends from the front face area 66 to the top surface 67 of the pressure member 61 and defines with the front face area 66 an angle of about 150°. The top surface 67 of the pressure member 61 extends parallel to the slide surface 64 and has a length of about 40% of length of the slide surface 64.

The closure lid or door 5 (FIG. 1) includes close to its end face 8 two cutouts 6, 7, which have for example of the same depth and which extend to one another. The cutout 6 further remote from the end face 8 has essentially the shape and size of the damper housing 31 including the damping element 30. The cutout 7 has the shape of the frame 13 of the joint housing 12.

For mounting the door 5, the cavity hinge 10 is inserted into the cutouts 7 and 8 and fixed in place. The frame 13 may be bent over at its edge or provided with flanges, which engage the surface of the door 5 around the cutout edges. Then the door 5 together with the cavity hinges 10 is fitted to the body 1 of the furniture piece. After proper alignment of the door 5, the cavity hinges 10 are mounted to the furniture body 1. In this first assembly step the cutout 6 remains empty.

For the pre-assembly of the damping element 30, the piston rod pressure member 61 is inserted into the opening 15 so that the engagement shoulder 62 abuts the side wall 18 from the outside of the joint housing 12. The cylinder 42 of the cylinder piston unit 40 is then inserted into the blind bore 34 of the damper housing 31 and if desired secured therein by cementing. The cylinder piston unit 40 may also be formed integrally with the damper housing 31. Then this assembly step is not necessary. The piston rod 44 is inserted and the housing 31 with the cylinder piston unit 40 is fitted into the cutout 6 of the door 5 and secured therein by cementing if desired and/or by screws 9. Then the piston rod 44 is inserted into the piston rod receiving bore 63 of the piston rod pressure member 61 wherein it may also be secured by cementing.

The piston rod pressure member 61 now extends with 80% of its length into the joint housing 12, see FIG.S. 6 and 8. The damping element 30 is now disposed in the pivot plane of the cavity hinge 10. The piston rod pressure member 61 is supported with its slide surface 64 on the bottom part 14 of the joint housing 12. The slide wedge surface 65 is disposed openly accessible in the joint housing 12. The compression spring 47 in the cylinder piston unit 40 is in a relaxed state.

In the initial state, the door or closing lid 5 is open (see FIG. 1). It defines with the front side 2 of the body 1 for example an angle of 110°. The cavity hinge 10 is for example over-extended in its open-end position.

Figure 9:
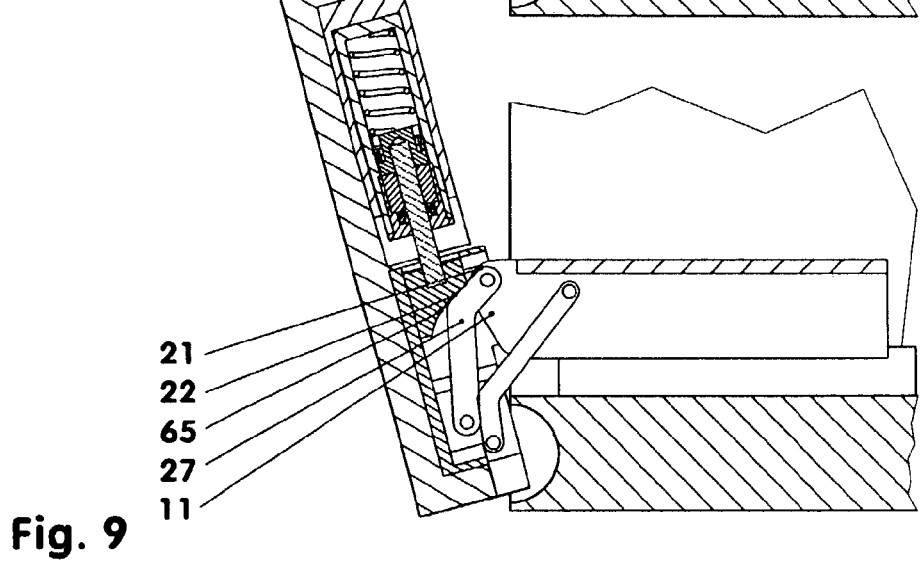
FIG. 9 shows the hinge of FIG. 8 angled by 75°.

When the door 5 is closed, the hinge levers 26, 27 pivot about the bolts 24, and respectively, 23 and the door 5 with the joint housing 12 pivots about the pivot bolts 28, 29. The door 5 executes in this way a predetermined pivot movement from the open end position toward the closed end position. For example, 15° before reaching the closed end position (see FIG. 9), the outer hinge lever 27 engages the slide wedge surface 65 of the piston rod pressure member 61. With a further closing movement of the door 5 possibly under the force of a leaf spring of the cavity hinge 10, the outer hinge lever 27 pushes the piston rod pressure member 61 and together therewith the piston rod 44 outwardly out of the joint housing 12. The outer hinge lever 27 forms the operating member for the damping element 30 and represents together with the slide wedge surface 65 of the piston rod pressure member 61 a slide wedge drive 27, 65.

Figure 10:
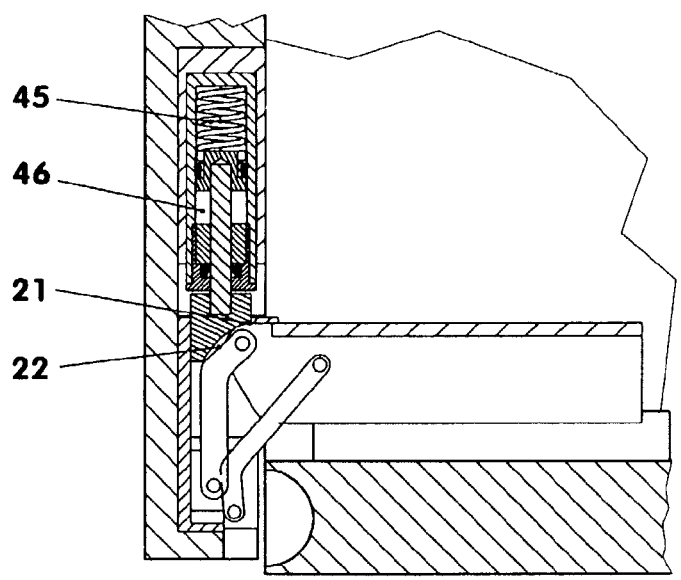
FIG. 10 is a sectional view of the hinge as shown in FIG. 7.

The piston 43 of the cylinder piston unit 40 is displaced toward the displacement chamber 45 and displaces thereby the hydraulic fluid therein in a throttled manner through the throttling grooves 53 into an expansion chamber 46, see FIG. 10. In this way, the closing movement of the door 5 is slowed down. The hinge lever 27 then further slides up the slide wedge surface 65, while the piston rod pressure member 61 is further displaced. The piston rod pressure member 61 slides with its slide surface 65 along the bottom part 14 of the joint housing 12 and moves the piston 43 farther into the displacement chamber 45. Shortly before the door reaches the closed end position, the mounting arm 11 for example engages, with a contact area 21 thereof, the slide wedge surface 65 and moves the piston rod pressure member 61 at an increased rate toward the piston cylinder unit 40. The closing movement of the door is therefore further slowed down until, upon reaching the closed end position, the speed is almost zero. The movement of the door is increasingly slowed down as the drive portions 11, 27, 61 slide along so that the door reaches its closed end position without any impact. In the expansion chamber 46, the open pore elastic stop member accommodates part of the displaced hydraulic fluid.

Figure 6:
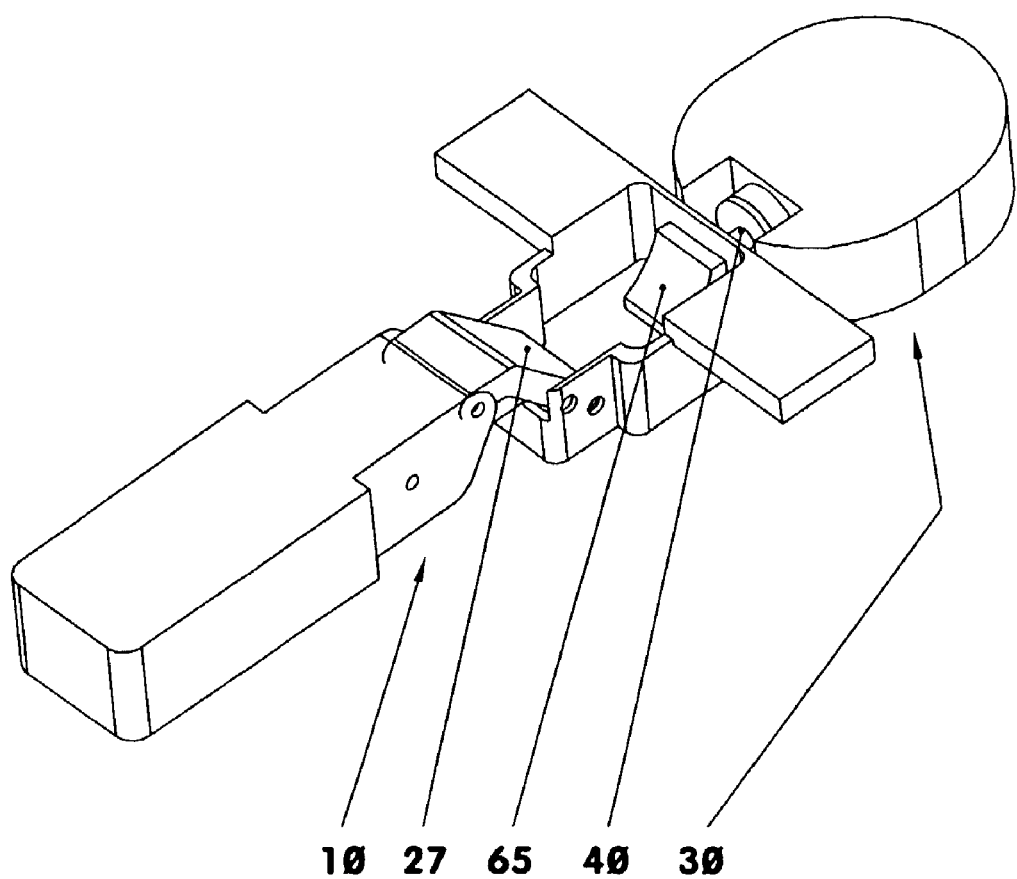
FIG. 6 shows a cavity hinge with a damping arrangement pivoted open, that is, in a stretched position.
Figure 7:
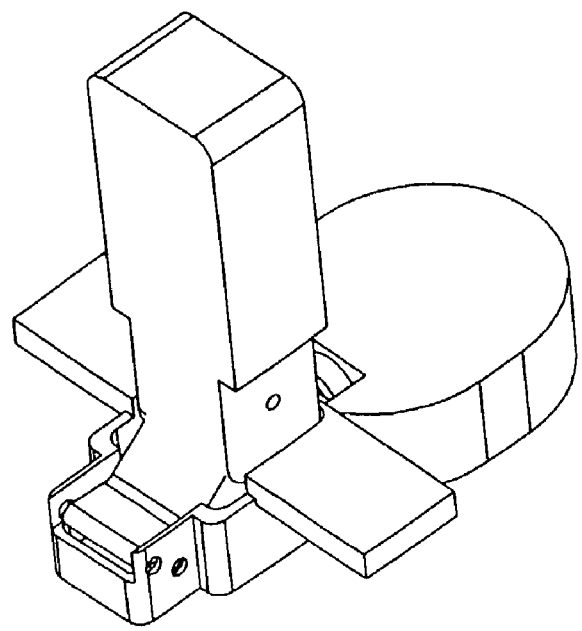
FIG. 7 shows the cavity hinge angled or closed.
Figure 8:
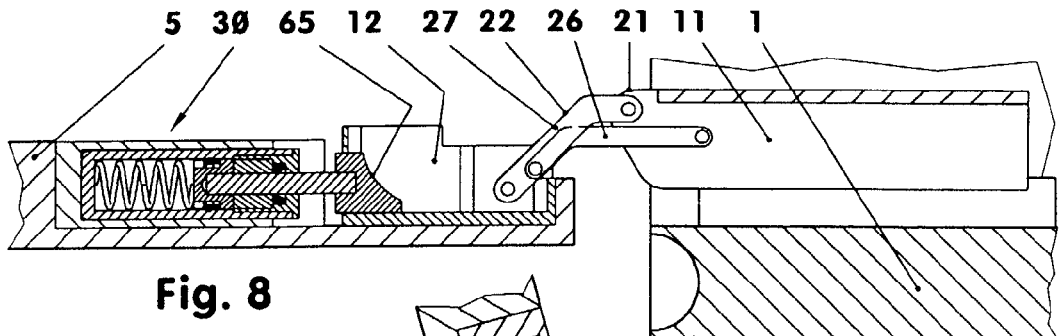
FIG. 8 is a sectional view of the hinge as shown in FIG. 6.
Figure 11:
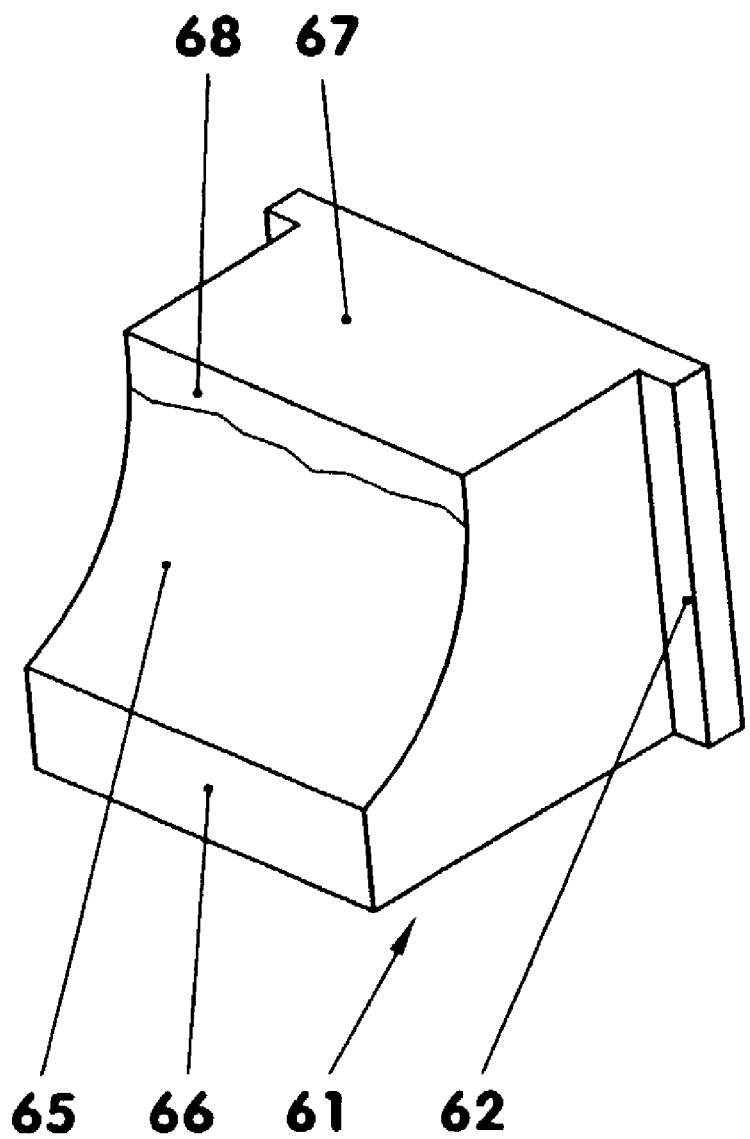
FIG. 11 shows a piston rod pressure member.

For opening the door, the door is pulled open into its open end position. During the opening the mounting arm 11 and the outer hinge lever 27 slide along the slide wedge surface 65 toward the upper side 67 of the piston rod pressure member 61. The compression spring 47 in the cylinder piston unit 40 pushes the piston 43 outwardly toward the joint housing 12. The piston rod pressure member 61 follows the outer hinge lever 27, until, at a pivot angle of about 15° from the closed end position, the pressure member 61 lifts off the hinge lever 27, see FIG. 9. The piston 43 of the cylinder piston unit 40 abuts now the elastic stop member 48. The piston rod pressure member 61 abuts with its shoulder 62 the frame side wall 18 and remains in this end position, see FIGS. 6, 8, 11.

In the embodiment shown, the arrangement includes two operating elements 11, 27 for operating the damping element 30. However, it is possible to use only one of these elements 11, 27 as operating element. This then comprises the contact area 22, which is the first to contact the slide wedge surface 65 when the door is closed.

The damping effect of the damping element 30 is determined among others by the contour of the slide wedge surface 65. This surface may also have a straight, convex or other continuous surface shape.

The slide surfaces 21, 22, 65, 14, 64 of the arrangement may be coated with Teflon® in order to minimize wear and friction of the slide portions.

In the slide wedge drive (components 11, 27, 61), the piston rod pressure member 62 may also include a roller on which the hinge lever is supported to reduce friction. Also, a roller bearing structure may be arranged between the slide surface 64 and the bottom part 14 on which the piston rod pressure member is linearly movably supported.

The damping element 30 may further be part of a cavity hinge 10 or another type of hinge. It is then installed in the furniture parts together with such other type of hinge.

In the embodiment disclosed herein, the cavity hinge 10 includes a tumbler means in the form of a leaf spring. However, a magnet, a tension spring or another closing device may be arranged between the relatively movable furniture parts. Also, an arrangement without closing means may be provided.

The piston 43 of the cylinder piston unit 40 may further include one or more over-pressure valves. They could be provided to open when the door 5 is slammed closed in order to prevent damage to the cavity hinge arrangement when excessive slow-down forces are effective because of the mass inertia of the door.

In order to prevent unwanted opening of the closed door 5, the slide wedge surface 65 may have a special shape. To this end, it includes, starting at the top surface 67, a blocking zone 68 which extends essentially parallel to the engagement shoulder 62. By this blocking zone 68, the mounting arm 11 is engaged with an area of its contact zone 21 in an essentially parallel manner so that the return spring 47 installed in the cylinder piston unit 40 (see FIG. 4) cannot force the door 5 open.

What is claimed is:

1. An arrangement for damping the pivot movement of a movable furniture component which is supported by a pivot joint on a stationary furniture part so as to be movable between two end positions, said arrangement including a damping element which is activated near one of the end positions of the movable component and which comprises a cylinder piston unit disposed between the movable furniture component and the stationary furniture part such that the piston is moved in said cylinder by movement of the movable furniture component and a fluid in the cylinder is displaced by said piston, one of the stationary furniture part and the movable furniture component including a mounting arm, a hinge lever supported pivotally with one end thereof on the mounting arm and supporting with its other end the movable component, said cylinder piston unit being mounted to the other of said stationary furniture part and said movable furniture component and the piston of the cylinder piston unit being operatively connected to a piston operating member which is arranged so as to be engaged by the hinge lever when the movable furniture component reaches one of the end positions, said hinge lever and said piston operating member forming a slide wedge drive including a slide wedge connected to said piston and being engaged by said hinge lever near the end position thereof for actuating the piston to dampen the movement of the movable furniture component when it approaches the end position, said mounting arm and said cylinder piston unit being part of the pivot support of the movable furniture component on the stationary furniture part.

2. An arrangement according to claim 1, wherein said piston has a piston rod and said piston rod is connected to said piston operating member.

3. An arrangement according to claim 1, wherein said pivot joint is a cavity hinge.

4. An arrangement according to claim 3, wherein said cavity hinge includes a hinge housing provided with an opening.

5. An arrangement according to claim 4, wherein said damping element is arranged in the movable furniture component in the pivot plan of the cavity hinge and the piston operating member extends through the opening in the hinge housing.

6. An arrangement according to claim 1, wherein the cylinder piston unit is a one-directionally acting damper and includes a return spring.

7. An arrangement according to claim 4, wherein the cavity includes inner and outer hinge levers and only the outer hinge lever engages the pistono-perating member.

8. An arrangement according to claim 2, wherein the piston-operating member includes a slide surface slidingly supported on an adjacent wall of the hinge housing.

9. An arrangement according to claim 1, wherein the damping element is a hydraulic damping device, which includes an over-pressure relief valve.

10. An arrangement according to claim 1, wherein the piston operating member of the slide wedge drive includes a blocking structure which extends essentially normal to the sliding movement of the hinge lever on the piston operating member and is arranged so as to hold the hinge member in the open position of the movable furniture component.

\* \* \* \* \*